May 1, 1923.  
J. SLEPIAN  
DYNAMO ELECTRIC MACHINE  
Filed Dec. 17, 1919

1,453,410

2 Sheets-Sheet 1

WITNESSES:  
H. J. Shelhamer  
a. a. Brand

INVENTOR  
Joseph Slepian  
BY  
Wesley G. Carr  
ATTORNEY

May 1, 1923.

J. SLEPIAN

DYNAMO ELECTRIC MACHINE

Filed Dec. 17, 1919

1,453,410

2 Sheets-Sheet 2

WITNESSES:
H. T. Shelhamer
A. O. Brand

INVENTOR
Joseph Slepian
BY
Wesley G. Carr
ATTORNEY

Patented May 1, 1923.

1,453,410

UNITED STATES PATENT OFFICE.

JOSEPH SLEPIAN, OF WILKINSBURG, PENNSYLVANIA, ASSIGNOR TO WESTINGHOUSE ELECTRIC & MANUFACTURING COMPANY, A CORPORATION OF PENNSYLVANIA.

DYNAMO-ELECTRIC MACHINE.

Application filed December 17, 1919. Serial No. 345,540.

*To all whom it may concern:*

Be it known that I, JOSEPH SLEPIAN, a citizen of the United States, and a resident of Wilkinsburg, in the county of Allegheny and State of Pennsylvania, have invented a new and useful Improvement in Dynamo-Electric Machines, of which the following is a specification.

My invention relates to dynamo-electric machines embodying commutators, and it has for its object to eliminate, during the communicating period, the transformer and the rotational electromotive forces which tend to exist in the armature coils undergoing commutation.

Figure 1:
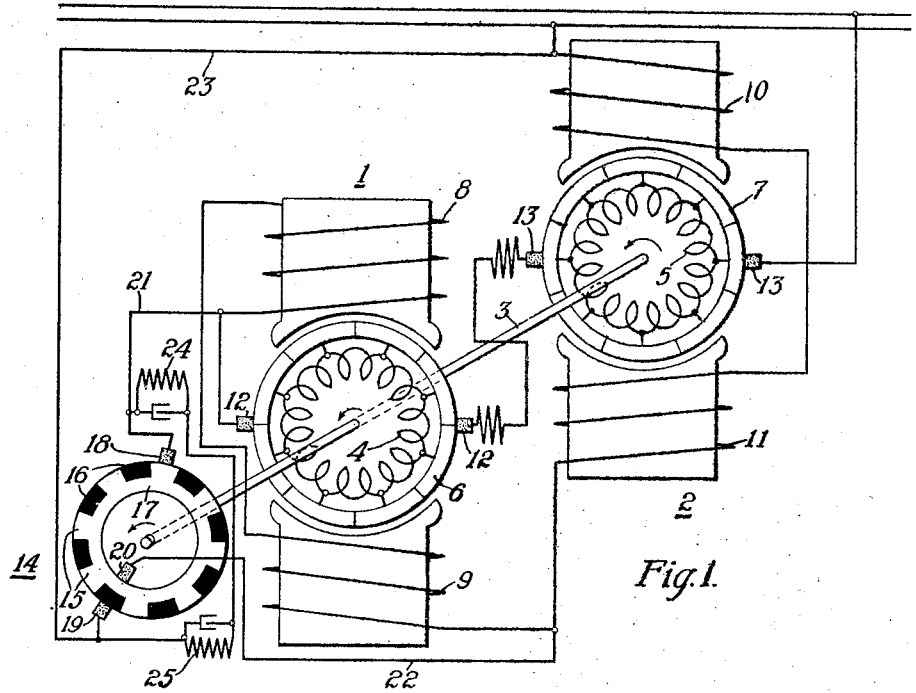
Figure 2:
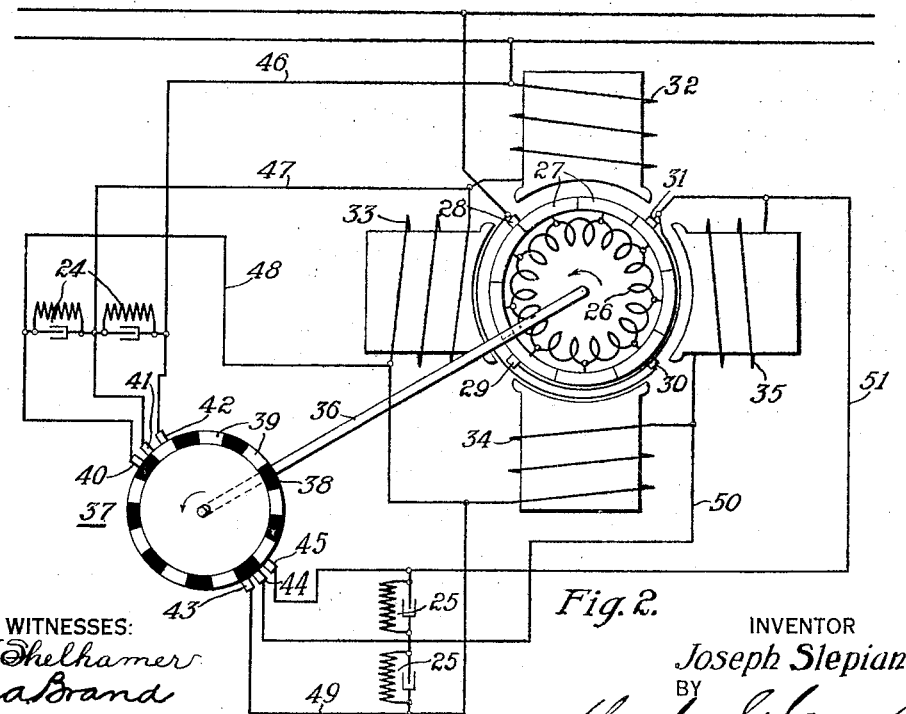
Figure 3:
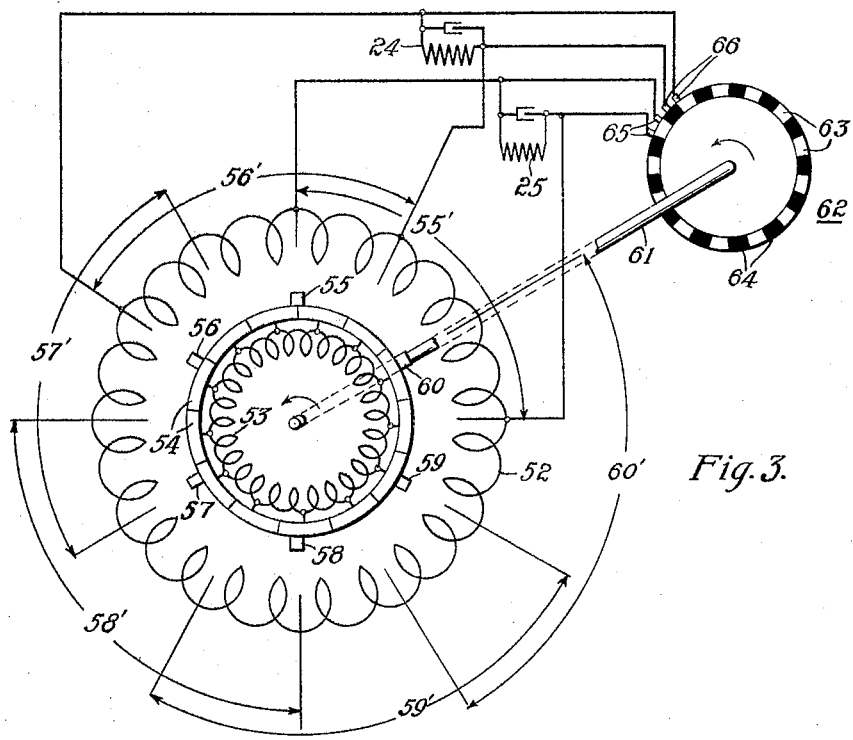
Figure 4:
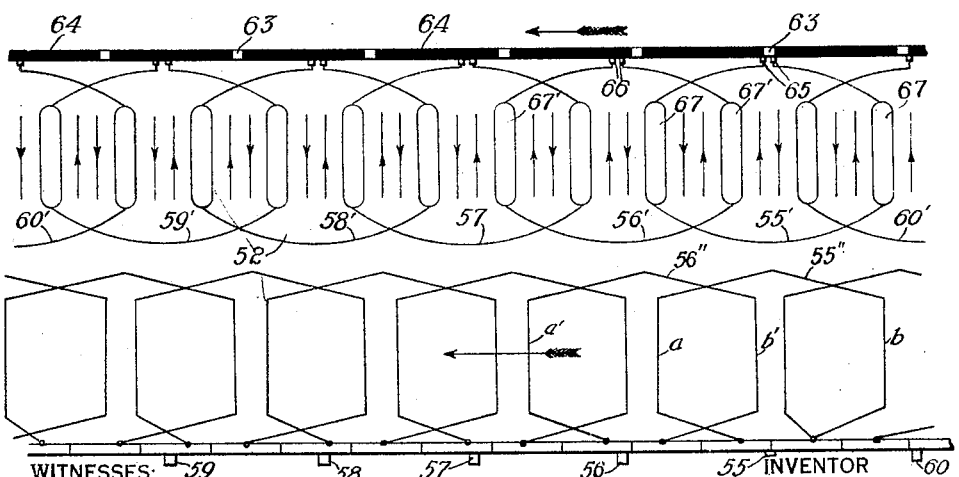

In the accompanying drawing, Figure 1 is an illustration of one embodiment of my invention; Figs. 2 and 3 are modifications of the system shown in Fig. 1, and Fig. 4 is a developed view of the windings embodied in the machine illustrated in Fig. 3.

In a dynamo-electric machine embodying a commutator and energized by alternating current, electromotive forces are set up in that coil of the armature which is about to undergo commutation. One of these forces is occasioned as a result of the changing flux through the field windings of the machine, which flux changes, of course, have the same frequency as that of the current with which the machine is supplied. It is, therefore, apparent that, during the period of commutation, the coil which is short circuited by a brush is in the most favorable position to embrace a maximum number of the changing lines of field flux and, therefore, a considerable electromotive force is established in such short-circuited coil. The existence of the electromotive force in question leads to considerable sparking, when the brushes leave the segments to which the short-circuited coils are connected.

In single-phase commutator machines, especially those having salient poles, the transformer electromotive force is the greatest source of commutator difficulties, and it is one of the objects of my invention to provide means whereby during the period in which an armature coil is being short circuited, the field winding which embraces substantially the same peripheral dimensions as does the armature coil undergoing commutation, has the flux therein held substantially constant. In other words, the flux change through the field winding is reduced to zero and, therefore, no transformer electromotive force is set up in the short-circuited armature coil.

Turning now to the consideration of polyphase commutator machines, I find that the voltage induced in a coil on the rotor member of a polyphase machine may be resolved into two components; one, the voltage which would be induced therein, considering the coil as standing still, that is, the transformer electromotive force which results from the rapid change of the magnetic flux linking the short-circuited coil; and two, the voltage which would be induced in the coil if the magnetic flux was momentarily constant and unchanging, and the coil at that time was rotated in the consequent constant field.

I addition, therefore, to providing means whereby the flux change in the field winding embracing the armature coil under communication is reduced to zero, I find it necessary to provide also means whereby the electromotive force which is set up in that armature coil on account of its rotation in the constant field shall be likewise reduced to zero. The last-named result is accomplished by so arranging the armature circuits of the machine that, when a coil thereof is undergoing commutation, the sides of that coil or those portions which tend to cut perpendicularly across the field flux, are disposed within a band of zero magnetic flux. With this last arrangement embodied in a machine, the rotational electromotive force is reduced to zero, since the sides of the armature coil will be cutting through a region of zero flux during the time that the particular coil in question is short circuited.

In practicing my invention, I, furthermore, find it desirable and necessary to so arrange the commutated winding, the commutator segments, and the brushes bearing thereupon, that but two of said segments, or, in other words, one of said armature coils, is short circuited at any one instance. By so arranging the circuits of my machine, it is, of course, somewhat more simple to obtain the required zero flux change, inasmuch as but one coil in the armature need be considered at any one time. However, as will hereinafter appear from the nature of some of the appended claims, I find that, even though the flux change is not reduced to zero, the provision of circuits and commutator segments related thereto in such manner that but one armature coil is short circuited at any one instant, results in greatly improved operation. I believe, therefore, that this specific disposition of the armature coils, commutator segments and brushes is a wholly novel and beneficial method of reducing, to a large extent, those commutation difficulties which have heretofore been present in machines of the character described because of the tendency for excessive sparking to occur therein. It is apparent that, with an arrangement wherein the sparking is reduced, the flash-over tendency which has heretofore been present in an extreme degree is substantially eliminated.

As will hereinafter more fully appear in connection with the detailed description of the various embodiments of my invention, I reduce the flux change through the predetermined field winding by so arranging auxiliary switching means that the field winding in question is short circuited during the time that the armature coil which is embraced by the flux threading therethrough is undergoing commutation. To those skilled in the art, it will be apparent that it is practically impossible to cause a change of flux through a short-circuited coil, and, therefore, the change of flux through the field member will be prevented.

Another advantage which is incident to the arrangement of the circuits in a machine embodying my invention is the facility and effectiveness wherewith the sparking tendency above referred to is transferred to an auxiliary commutating member which I utilize as the switching means, above referred to, to short circuit the field windings at predetermined times. In commutator machines, as heretofore employed, it has been a matter of difficulty to properly associate therewith spark-suppressing devices, for reasons which will be known to those skilled in the art.

However, when the auxiliary commutator or switching means, above referred to, is employed, the sparking tendency is exhibited across a portion of the apparatus where the voltage is negligible, and, therefore, even though sparking would tend to exist because of the rapid connecting and disconnecting of the short-circuiting device with and from the field winding, it is a simple matter to so associate with the auxiliary-commutator-spark-suppressing means that the commutation of the machine aggregate, as a whole, is substantially free from this difficulty. It is substantially impossible, therefore, for a flash-over to take place with a machine embodying the auxiliary commutator.

In the embodiment of my invention illustrated in Fig. 1, a commutator-machine aggregate comprising two series-connected, single-phase, series, commutator machines 1 and 2, is shown. Mounted on a shaft 3 are rotor members 4 and 5 connected to commutator segments 6—6 and 7—7, respectively. Field windings 8—9 and 10—11 influence the rotor windings 4 and 5, respectively, while brushes 12—12 and 13—13 bear on the commutator segments 6—6 and 7—7, respectively.

At this point, it may be noted that the rotor member 4 and its associated commutator segments 6—6 are so displaced, at the time shown, with respect to the other rotor member 5 which is rigidly mounted upon the shaft 3, that the brushes 12 are short circuiting armature coils while the brushes 13 are mid-way between the points at which they likewise will short circuit armature coils.

An auxiliary switching means 14, here shown as embodying a substantial commutator construction, is likewise mounted rigidly upon the shaft 3 and operates to effect the short circuiting of the various field windings at predetermined times. The member 14 comprises conducting segments 15—15 and non-conducting segments 16—16, the conducting segments 15 being connected together by an internally-disposed annular ring of conducting material 17. Brushes 18 and 19 bear upon the outer periphery of the member 14, and a brush 20 coacts with the annular conducting member 17. As shown, the brushes 18 and 19 are so disposed that they alternately coact with one of the conducting segments 15, but it is to be understood that they, at no time, are both touching one of said conducting segments.

A shunt path is established around the field winding 8—9 by leads 21 and 22, the lead 21 being connected to the brush 18 and the lead 22 being connected to the brush 20. It will be understood that, in the position of the apparatus shown, the field circuit 8—9 is short circuited through the lead 21, the brush 18, one of the segments 15, the ring 17, the brush 20 and the lead 22.

Likewise, a shunt path is established around the field winding 10—11 by a lead 23 and the lead 22, the last-named lead being common to the two field winding connections and the lead 23 being connected to the brush 19. When the shaft 3 is so rotated that two of the segments 7—7 have been connected together by the brushes 13, the member 14 will also have rotated to such a position that the brush 19 is bearing upon one of the commutator segments 15, and, therefore, the shunt path around the field winding 10—11 will be completed through the lead 23, the brush 19, segments 15, ring 17, brush 20 and lead 22.

The operation of the above-described machine is as follows: Whenever the brushes 12 short circuit coils of the rotor member 4, the field winding 8—9 is short-circuited through the proper positioning of the elements on the auxiliary commutator 14, and, in the same manner, when the segments 7—7 on the other commutator are short-circuited by the brushes 13, the field winding 10—11 will be short circuited.

Inasmuch as the field windings embracing the flux which is threading the short-circuited armature coil, are, in each case, short-circuited during the commutation of the associated coil, no flux change can take place therethrough. Consequently, no transformer electromotive force is established and no excessive sparking is occasioned upon the approach to, and the departure from, the short-circuited segments, by the brushes.

All of the sparking tendency is transferred, in the above machine aggregate, to the auxiliary commutator 14, and it will be observed that the normal voltage across either the brushes 18 or 19 and the brush 20 is negligible and, therefore, what sparking tendency does exist may be suppressed by suitably disposed spark-suppressing means 24 and 25, here shown as comprising condensive and resistive elements.

While the above-described embodiment of my invention illustrates, in the most simple manner, the disposition of the various elements utilized therein, I find that, for single-phase operation, the machine illustrated in Fig. 2 affords a very compact and efficient structure. The machine herein illustrated comprises a rotor member 26 provided with, and connected to, commutator segments 27—27 upon which bear brushes 28, 29, 30 and 31. Field windings 32, 33, 34 and 35 are adapted to influence the rotor winding 26. A shaft 36 is provided for the machine and a commutator member 37 is likewise secured thereto, the latter comprising conducting segments 39—39 and insulating segments 38—38. Brushes 40, 41, 42, 43, 44 and 45 bear upon the commutator 37 and are connected, by hereinafter described leads, to the field windings for purposes to be described. Energy for the operation of the machine is derived from a single-phase source, as shown.

I will now describe the remaining unmentioned circuits and arrangement of my machine aggregate in connection with a statement of the operation thereof. Primarily, it should be observed that the segments 27 are of such number and are so related to the positioning of the brushes 28 to 31 inclusive, that no more than two of the segments shall be connected together at any one instant, and it should, furthermore, be noted that the connection of the segments is progressive, in the direction of rotation of the machine. Of course, the positioning of the brushes is only illustrative, since it is impossible to properly illustrate, in a figure of this character, a drum winding such as is commonly used in machines of this type, the ring winding, as shown, lending itself more readily to illustration and explanation.

At the moment assumed, the brush 28 is connecting two segments together and is therefore short circuiting an armature coil or coils. The flux which this short-circuited portion of the armature winding embraces is assumed to be the flux which is set up by, and threads through, the field winding 32. In order, therefore, to insure that no transformer electromotive force shall be set up in the armature coil during the time it is undergoing commutation, it is necessary that the flux change through the field winding 32 be reduced to zero, or, in other words, that the flux therein be maintained constant at substantially the value which it has at the instant the brush begins to short circuit the armature coil in question.

Leads 47 and 46, from the respective terminals of the field coil 32, are connected to the brushes 41 and 42, the latter being, at the instant, shown connected together by one of the segments 39. Consequently, a shunt path is established around the field coil 32, and the same is short circuited. Therefore, it is impossible for the flux threading therethrough to change and, since the flux remains constant on account of the operation of Lenz's Law, no transformer electromotive force is set up in the armature coil undergoing commutation. In a like manner, the brushes 40 and 41 establish a shunt path around the field winding 33 through a lead 48 and the lead 47, during the time that the two commutator segments which are approaching connection through the brush 29 are short circuited.

The brushes 43, 44 and 45 operate, in a like manner, with the rotating commutator 37 to establish shunt paths around the field windings 34 and 35 at the predetermined proper times through leads 49, 50 and 51. As in Fig. 1, spark-suppressing means 24 and 25 are associated with the proper circuits in Fig. 2.

In connection with the above-described machine, it should be observed that, even if the transformer electromotive force were not eliminated by the short circuiting of predetermined field windings, the positioning of the brushes so that not more than one armature coil may be short circuited at any one instant, results in a commutator-machine structure in which the sparking and subsequent flash-over tendency are reduced to a minimum. This feature I believe to be broadly new in machines of this character and the subject of proper sub-combination claims.

Turning now to the embodiment of my invention in polyphase commutator machines, another disturbing element must be considered and eliminated, that is, the heretofore described existence of rotational electromotive force in the armature coil undergoing commutation on account of the sides thereof passing through the bands of flux during the commutation. This additional problem arises in connection with machines of a polyphase character because of the present methods of positioning the field winding thereof.

As shown in Fig. 3, a polyphase machine is provided with a continuous field winding 52 and an armature winding 53, the latter being connected to commutator segments 54. Brushes 55, 56, 57, 58, 59 and 60 are so related to the segments 54 that the same advantages are present with respect to the non-connection of more than any two commutator segments at one instant, as were described in connection with Fig. 2, and it will be noted that the brush 55 is, at the instant shown, short circuiting two of the commutator segments. The two segments which are short circuited are connected to a portion of the armature winding which is assumed to embrace the same field flux as is threading through a portion of the field winding indicated at 55'. Here, again, the ring winding has been used for purposes of illustration only, and it should be understood that, with the drum type of winding, the short circuited coil may extend one hundred and eighty electrical degrees or ninety mechanical degrees, to the right of the segments short circuited by the brush 55, and, therefore, that the flux threading therethrough is set up by substantially one quarter of the entire field winding.

Proceeding around the field winding in a counterclockwise direction, that is, in the direction of rotation of the machine, I have designated the successive portions of the field winding which embraces the same flux as the armature coils which are short circuited by the brushes 56 to 60, inclusive, by the corresponding numbers primed.

The machine is provided with a shaft 61 upon which is mounted an auxiliary commutator 62 comprising conducting segments 63—63 and insulating segments 64—64. For simplicity of illustration, I have shown two of the field portions as capable of being short circuited, but it will be understood that the remaining connections may be supplied and that, therefore, I am not limiting my invention to what is illustrated.

Brushes 65—65 are shown, at the instant assumed, as connected together through a segment 63 of the commutator 62, and it will be observed that they function to establish a shunt path around the portion 55' of the field winding, whereby the flux change through that portion of the winding is reduced to zero and the tendency for a transformer electromotive force to be established in the armature coil, which is short circuited by the brush 55, is eliminated. At a predetermined time later, the brush 56 will short circuit two segments and, therefore, it is necessary, at the same time, to short circuit the portion 56' of the field winding, and this is accomplished through suitable connections and brushes 66. The other portions of the field winding are progressively short-circuited as the corresponding brushes short-circuit portions of the armature winding.

In Fig. 4, I have shown the field winding circuit and the armature circuit in a developed form, in order to more clearly illustrate the manner in which I propose to eliminate the rotational electromotive force which, as hereinbefore indicated, exists in the short-circuited armature coil by reason of its passage through a field of constant flux during the commutation period.

The field winding 52 is illustrated as comprising a winding lying in slots as shown, and, for simplicity, the only connections between the conductors in the various slots are the short circuiting connections which have heretofore been described, the various portions of the field winding being designated by the same reference numerals as were used in Fig. 3.

The armature winding 53 is also shown in a developed form but only seven coils have been shown, this number being sufficient for illustrating the principle of the invention. The coils in question are connected to the proper commutator segments and these commutator segments are, in turn, shown as cooperating with brushes 55 to 60 inclusive. Arrows indicate that the auxiliary commutator 62 and the armature winding 53, with its associated commutator segments, move in the direction indicated. As shown, the brush 55 is short circuiting one armature coil, and the brush 56 will be the next one to so function. The segment 63 on the auxiliary commutator 62 is shown as connecting together the brushes 65, which are instrumental in short circuiting the portion 55' of the field winding.

In order to prevent the generation of a rotational electromotive force in the short circuited coil 55'', it is necessary that the coil sides $a$ and $b$ thereof pass through a region of zero flux during the time that the coil is being commutated. I propose, therefore, to establish, in the field winding, areas through which it is impossible for flux to thread and to so position these areas that, at the moment a predetermined armature coil is undergoing commutation, the coil sides of the latter will correspond thereto and, therefore, since the aforesaid coil sides are passing through regions of zero flux, no voltage will be generated therein on account of the rotation thereof. I establish such areas of zero flux by placing permanent short-circuited turns 67 on the field winding, it being understood by those skilled in the art that no flux can be forced through a permanently short-circuited turn of this character.

It will be observed that the coil sides $a$ and $b$ are directly under these short-circuited turns and, therefore, they are in regions of zero flux. When the coil 56″ is short circuited by the brush 56, the coil sides $a'$ and $b'$ thereof will likewise come under short-circuited turns 67′—67′, and so on, for all of the armature coils in the winding 53.

While I have illustrated the short-circuited turns for the suppression of the rotational electromotive force as comprising short-circuited portions of the field winding itself, it is obvious that the slots in these regions may be made somewhat deeper and a separate turn placed therein.

Moreover, in all of the above-described machines, I have assumed that the field winding is short circuited to "kill" the flux change therein, but I wish it understood that the same end may be attained by placing a separate winding in the positions indicated and arranging the auxiliary commutator to short circuit the same at predetermined periods.

While I have described but three modifications of my invention, I do not wish to be limited by the specific showings heretofore considered, inasmuch as I believe that the principle embodied in my invention is broadly new, and I desire, therefore, that the latter shall be limited only by the showing of the prior art or by the scope of the appended claims.

I claim as my invention:

1. In combination, a dynamo-electric machine embodying a commutated winding and field windings and means for opposing a change of flux in a field winding during the period of short-circuit of a portion of the commutated winding which embraces substantially the same field-flux as said field winding.

2. In combination, a dynamo-electric machine embodying a commutated winding and field windings and means for short-circuiting a field winding during the period of short-circuit of a portion of the commutated winding which is influenced by the flux linkage through said field winding.

3. In combination, an alternating-current dynamo-electric machine embodying a commutated winding and field windings, and means for keeping constant the flux through a portion of the field winding while the commutated winding influenced by that flux is undergoing commutation.

4. In combination, an alternating-current dynamo-electric machine embodying a commutated winding and field windings, and means for short-circuiting a portion of the field winding while the commutated winding influenced by said portion of the field winding is undergoing commutation.

5. In combination, an alternating-current dynamo-electric machine embodying a commutated winding and field windings, and means for establishing a shunt path around that portion of the field winding which is influencing the part of the commutator winding undergoing commutation.

6. In combination, an alternating-current dynamo-electric machine embodying a commutated winding and field windings, and means adapted to establish a shunt path around that portion of the field winding which is influencing the portion of commutated winding undergoing commutation during substantially the same period that said commutating winding portion is short-circuited.

7. A dynamo-electric machine embodying field windings and an armature winding provided with commutator segments and brushes bearing thereupon, the dimensions of each brush being such that not more than two commutator segments may be bridged thereby, and means for short circuiting predetermined portions of the field winding when an armature coil is short circuited by one of said brushes.

8. A dynamo-electric machine embodying field windings and a rotatable armature winding provided with a commutator, and means for short-circuiting a portion of the field winding while the armature coils influenced thereby are being commutated, said means being governed by the rotation of said commutator.

9. A dynamo-electric machine embodying field windings and a rotatable armature winding comprising a plurality of coils, commutator segments to which said coils are connected, means whereby but one of said armature coils is short circuited at once, and means whereby that portion of the field winding tending to establish a transformer electromotive force in said short-circuited armature coil is short circuited.

10. A dynamo-electric machine embodying field windings and a rotatable armature winding comprising a plurality of coils, commutator segments to which said coils are connected, brushes severally of less width than that of one of said segments, said armature coils being so adjusted that not more than two commutator segments are short-circuited at any one time, and means whereby that portion of the field winding tending to establish a transformer electromotive force in said short-circuited armature coil is short-circuited.

11. A dynamo-electric machine embodying field windings and a rotatable armature winding comprising a plurality of coils, commutator segments to which said coils are connected, means whereby but one of said armature coils is short circuited at once, and contactor means so synchronized with the brush and commutator segment positioning that the portion of the field winding tending to establish a transformer electromotive force in said short-circuited armature coil is short-circuited.

12. A dynamo-electric machine embodying field windings and a rotatable armature winding comprising a plurality of coils, commutator segments to which said coils are connected, brushes severally of less width than that of one of said segments, said brushes being so positioned with respect to said commutator segments that but two of the latter are short-circuited at any one instant, an auxiliary commutator mounted to rotate in predetermined fixed relation to said armature winding, and means whereby said auxiliary commutator operates to establish a shunt path around the field winding which is influencing the portion of the armature which is short-circuited by the bridging of said main commutator segments.

13. A dynamo-electric machine embodying field windings and a rotatable armature winding comprising a plurality of coils, segments of a commutator, brushes to which said coils are connected severally of less width than that of one of said segments, said brushes being so positioned with respect to said commutator segments that but two of the latter are short-circuited at any one instant, an auxiliary commutator mounted to rotate in predetermined fixed relation to said armature winding, means whereby said auxiliary commutator operates to establish a shunt path around the field winding which is influencing the portion of the armature which is short-circuited by the bridging of said main commutator segments, and spark-suppressing means associated with the said auxiliary commutator and said field-winding-shunting means.

14. An alternating current machine embodying field windings, a relatively rotatable armature winding, a main commutator member associated with said armature winding, said field windings including windings having short-circuiting circuits, and means including an auxiliary commutator member for controlling said short-circuiting circuits.

15. In combination with an alternating-current machine embodying a commutator, an auxiliary commutator associated therewith, means comprising short-circuiting connections for transferring the sparking tendency to said auxiliary commutator, spark-suppressing means associated with the auxiliary commutator, and means whereby the portion of the commutator-machine-field winding which is embraced by a short-circuited armature coil thereof is short-circuited at the instant the latter is undergoing commutation.

16. A dynamo-electric machine embodying a commutator comprising a plurality of segments, brushes so disposed with respect to said segments that not more than two thereof are short-circuited at any one time and further so arranged that they progressively operate to so short-circuit the segments.

17. A dynamo-electric machine embodying field windings, an armature winding connected to commutator segments, brushes bearing thereupon, and means associated with said field winding whereby the coil sides of said armature winding during the short-circuiting of a portion thereof by one of said brushes, are prevented from generating an electromotive force.

18. A dynamo-electric machine embodying field windings, an armature winding, commutator segments to which said winding is connected, brushes bearing upon said segments, and intermittently operating means for damping out the field flux which would normally thread the coil sides of the portion of the armature winding undergoing commutation.

19. A dynamo-electric machine embodying field windings, an armature winding, commutator segments to which said winding is connected, brushes bearing upon said segments, means for causing the coil sides of that portion of the armature winding undergoing commutation to be disposed in a band of zero flux during the time of short-circuiting, and means for rendering constant the entire flux in the field portion embraced by the short-circuited commutator coil, during the same time.

20. A dynamo-electric machine embodying field windings, an armature winding, commutator segments to which said winding is connected, brushes bearing upon said segments, and means, comprising a short-circuited turn associated with said field winding, for damping out the field flux which would normally thread the coil sides of the portion of the armature winding undergoing commutation.

21. A dynamo-electric machine embodying field windings, an armature winding, commutator segments to which said winding is connected, brushes bearing upon said segments, and means comprising short-circuited turns associated with said field winding, said turns being so positioned that they embrace the flux band which normally threads the coil sides of the armature winding undergoing commutation, whereby said coil sides are ineffective in generating an electromotive force.

22. A dynamo-electric machine embodying a winding, commutator segments to which said winding is connected, and a plurality of brushes so related to said winding that but two of said segments are short-circuited at any one instant.

23. A dynamo-electric machine embodying a winding, commutator segments to which said winding is connected, and a plurality of brushes so related to said winding that only one brush short circuits a portion of the winding at any one instant.

24. In an alternating-current dynamo-electric machine embodying a commutated armature winding and field windings, the method of eliminating the transformer electro-motive force in the armature winding undergoing commutation which consists in reducing to zero the flux change in that portion of the field winding which embraces said armature winding undergoing commutation.

25. In an alternating-current dynamo-electric machine embodying a commutated armature winding and field windings, the method of eliminating the transformer and rotational electromotive forces in the armature winding undergoing commutation which consists in reducing to zero the flux change in that portion of the field winding which embraces said armature winding undergoing commutation and, at the same time, positioning the coil side of said armature winding in a region of zero flux.

26. In an alternating-current dynamo-electric machine embodying a commutated armature winding and field windings, the method of eliminating the transformer electro-motive forces in the armature winding undergoing commutation which consists in reducing to zero the flux change through said armature coil, irrespective of the relative speed of said windings.

27. An alternating current dynamo-electric machine aggregate embodying a plurality of commutated armature winding circuits connected in series, field windings for said armature winding circuits, respectively, said field windings being connected in series circuit relation, said commutated armature winding circuits being so related that the coils thereof undergo commutation at different times, and means for providing a shunt path around that portion of a field winding which is influencing the commutating winding coil undergoing commutation during substantially the same period that said commutating winding coil is short-circuited.

28. An alternating current dynamo-electric machine aggregate embodying a plurality of commutated armature winding circuits, and field windings for said armature winding circuits, said commutated armature winding circuits being so related that the coils thereof undergo commutation at different times, 29. An alternating current dynamo-electric machine aggregate embodying a plurality of commutated armature winding circuits, field windings for said armature winding circuits, said commutated armature winding circuits being so related that the coils thereof undergo commutation at different times, and means for providing a shunt path around that portion of a field winding which is influencing the commutating winding coil undergoing commutation during substantially the same period that said commutating winding coil is short-circuited.

30. An alternating current dynamo-electric machine aggregate embodying a plurality of commutated armature winding circuits connected in series, field windings for said armature winding circuits, respectively, said commutated armature winding circuits being so related that the coils thereof undergo commutation at different times, and means associated with each field winding for keeping constant the flux through a portion of the field winding while the commutated winding influenced by that flux is undergoing commutation.

31. An alternating current dynamo-electric machine aggregate embodying a plurality of commutated armature winding circuits, field windings for said armature winding circuits, respectively, said field windings being connected in series circuit relation, said commutated armature winding circuits being so related that the coils thereof undergo commutation at different times, and means for providing a shunt path around that portion of a field winding which is influencing the commutating winding coil undergoing commutation during substantially the same period that said commutating winding coil is short-circuited.

32. An alternating current dynamo-electric machine aggregate embodying a plurality of commutated armature winding circuits connected in series, exciting field windings for said armature winding circuits, respectively, said field windings being connected in series circuit relation, said commutated armature winding circuits being so related that the coils thereof undergo commutation at different times, and commutating means for short-circuiting the exciting field winding of each of said armature winding circuits during the periods of time when the armature coils thereof are undergoing commutation.

33. An alternating current dynamo-electric machine aggregate embodying a plurality of commutated armature winding circuits connected in series, exciting field windings for said armature winding circuits, respectively, said commutated armature winding circuits being so related that the coils thereof undergo commutation at different times, and commutating means for short-circuiting the exciting field winding of each of said armature winding circuits during the periods of time when the armature coils thereof are undergoing commutation.

34. An alternating current dynamo-electric machine aggregate embodying a plurality of commutated armature winding circuits, exciting field windings for said armature winding circuits, respectively, said field windings being connected in series circuit relation, said commutated armature winding circuits being so related that the coils thereof undergo commutation at different times, and commutating means for short-circuiting the exciting field winding of each of said armature winding circuits during the periods of time when the armature coils thereof are undergoing commutation.

35. In combination, an alternating-current dynamo-electric machine embodying a commutated armature winding, said armature winding having its respective coils undergoing commutation during only a portion of the time, a field winding embracing substantially the same flux as the armature winding coils undergoing commutation, and means for keeping constant the flux through said field winding during the periods in which said coils are undergoing commutation.

36. In combination, an alternating-current dynamo-electric machine embodying a commutated armature winding, said armature winding having its respective coils undergoing commutation during only a portion of the time, a field winding embracing substantially the same flux as the armature winding coils undergoing commutation, and commutating means for close-circuiting said field winding during the periods in which said coils are undergoing commutation.

37. In combination, an alternating current machine embodying a commutated armature winding, an exciting field winding, said armature winding having its respective coils undergoing commutation during only a portion of the time, and means for close-circuiting said field winding during the periods in which said coils are undergoing commutation.

In testimony whereof, I have hereunto subscribed my name this 8th day of December, 1919.

JOSEPH SLEPIAN.